US012235971B2

(12) United States Patent
Alam et al.

(10) Patent No.: US 12,235,971 B2
(45) Date of Patent: Feb. 25, 2025

(54) HISTORICAL RISK ASSESSMENT FOR RISK MITIGATION IN ONLINE ACCESS CONTROL

(71) Applicant: EQUIFAX INC., Atlanta, GA (US)

(72) Inventors: Md Shafiul Alam, Kennesaw, GA (US); Jonathan Boardman, Atlanta, GA (US); Xiao Huang, Marietta, GA (US); Jeffery Dugger, Atlanta, GA (US); Matthew Turner, Atlanta, GA (US)

(73) Assignee: Equifax Inc., Atlanta, GA (US)

( * ) Notice: Subject to any disclaimer, the term of this patent is extended or adjusted under 35 U.S.C. 154(b) by 266 days.

(21) Appl. No.: 18/060,460

(22) Filed: Nov. 30, 2022

(65) Prior Publication Data

US 2024/0176889 A1    May 30, 2024

(51) Int. Cl.
*G06F 21/00* (2013.01)
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| 7,249,076 B1 | 7/2007 | Pendleton et al. |
| 7,720,750 B2 | 5/2010 | Brody et al. |
| 8,001,041 B2 | 8/2011 | Hoadley et al. |
| 8,078,524 B2 | 12/2011 | Crawford et al. |

(Continued)

FOREIGN PATENT DOCUMENTS

| WO | WO-2018084867 A1 * | 5/2018 | ............. G06N 20/00 |
| WO | WO-2021034932 A1 * | 2/2021 | ............. G06N 3/045 |
| WO | 2022062193 A1 | 3/2022 | |

OTHER PUBLICATIONS

Ancona, et al., "Towards Better Understanding of Gradient-Based Attribution Methods for Deep Neural Networks", Available Online at: https://arxiv.org/pdf/1711.06104.pdf, Mar. 7, 2018, 16 pages.

(Continued)

*Primary Examiner* — Andrew J Steinle
(74) *Attorney, Agent, or Firm* — Kilpatrick Townsend & Stockton LLP

(57) ABSTRACT

Systems and methods for automated historical risk assessment for risk mitigation in online access control are provided. An entity assessment server can receive a request to assess a risk indicator change from a first risk indicator to a second risk indicator. For each attribute used to generate the first risk indicator and second risk indicator, a first impact can be determined for changing from the first risk indicator to a third risk indicator between the first risk indicator and the second risk indicator. A second impact similarly can be determined for changing from the third risk indicator to the second risk indicator. Aggregating the first impact and the second impact can determine a total impact of each attribute. Assessment results can be generated to include a list of attributes ordered according to the respective total impact and transmitted to a remote computing device for use in improving the risk indicator.

20 Claims, 7 Drawing Sheets

(56) References Cited

U.S. PATENT DOCUMENTS

| | | | |
|---|---|---|---|
| 9,916,621 | B1 | 3/2018 | Wasser et al. |
| 10,565,643 | B2 | 2/2020 | Rohn et al. |
| 11,308,551 | B1 | 4/2022 | Mahacek et al. |
| 2006/0212386 | A1 | 9/2006 | Willey et al. |
| 2007/0112668 | A1 | 5/2007 | Celano et al. |
| 2010/0268639 | A1 | 10/2010 | Feinstein et al. |
| 2014/0156501 | A1 | 6/2014 | Howe |
| 2014/0258089 | A1 | 9/2014 | Pearson et al. |
| 2014/0365355 | A1 | 12/2014 | Shvarts |
| 2019/0311427 | A1 | 10/2019 | Quinn et al. |

OTHER PUBLICATIONS

Bach, et al., "On Pixel-Wise Explanations for Non-Linear Classifier Decisions by Layer-Wise Relevance Propagation", PLOS One, Available Online at: https://journals.plos.org/plosone/article/file?id=10.1371/journal.pone.0130140&type=printable, Jul. 10, 2015, pp. 1-46.

Kindermans, et al., "Investigating the Influence of Noise and Distractors on the Interpretation of Neural Networks", Available Online at: https://arxiv.org/pdf/1611.07270.pdf, Nov. 22, 2016, 7 pages.

Modarres, et al., "Towards Explainable Deep Learning for Credit Lending: A Case Study", Available Online at: https://arxiv.org/pdf/1811.06471.pdf, Nov. 30, 2018, 8 pages.

Shrikumar, et al., "Learning Important Features Through Propagating Activation Differences", Proceedings of the 34th International Conference on Machine Learning, vol. 70, Apr. 10, 2017, 9 pages.

Shrikumar, et al., "Not Just a Black Box: Learning Important Features Through Propagating Activation Differences", Available Online at: https://arxiv.org/pdf/1605.01713.pdf, Apr. 11, 2017, 6 pages.

Simonyan, et al., "Deep Inside Convolutional Networks: Visualising Image Classification Models and Saliency Maps", Available Online at: https://arxiv.org/pdf/1312.6034.pdf, Apr. 19, 2014, 8 pages.

Springenberg, et al., "Striving for Simplicity: The All Convolutional Net", Available Online at: https://arxiv.org/pdf/1412.6806.pdf, Apr. 13, 2015, pp. 1-14.

Sundararajan, et al., "Axiomatic Attribution for Deep Networks", Proceedings of the 34th International Conference on Machine Learning, vol. 70, Jun. 13, 2017, 11 pages.

Sundararajan, et al., "The Many Shapley Values for Model Explanation", Available Online at: https://arxiv.org/pdf/1908.08474.pdf, Feb. 7, 2020, pp. 1-20.

Zeiler, et al., "Deconvolutional Networks", IEEE Computer Society Conference on Computer Vision and Pattern Recognition, Jun. 13-18, 2010, 8 pages.

\* cited by examiner

Impact of Attributes to Your Risk Indicator Change from 0.90 to 0.53

| Previous Assessment Point | Current Assessment Point |
|---|---|
| Rate of Data Transfer for Past Twelve Hours: 17% | Number Installment Trades Worst Rating 30 Days Past Due within 3 Months: 16%<br><br>Risk Indicator Decrease by 0.14 |
| Percent Requests Satisfactory to Requests Submitted Within 1 Week: 11% | Percent Trades Satisfactory within 6 Months to Trades Reported within 6 Months: 10%<br><br>Risk Indicator Decrease by 0.11 |
| Number of Vulnerabilities with Highest Risk Within 1 Month: 15% | Number Trades Worst Rating 30 Days Past Due within 3 Months: 12%<br><br>Risk Indicator Decrease by 0.09 |
| Number of Unaddressed Vulnerabilities Within 1 Month: 13% | Number Trades Opened within 3 Months: 10%<br><br>Risk Indicator Decrease by 0.03 |

FIG. 6

HISTORICAL RISK ASSESSMENT FOR RISK MITIGATION IN ONLINE ACCESS CONTROL

TECHNICAL FIELD

The present disclosure relates generally to artificial intelligence. More specifically, but not by way of limitation, this disclosure relates to using machine learning or other modeling algorithms that emulate intelligence to assess historical risk indicators for mitigating risks involved in online access control.

BACKGROUND

Machine-learning and other automated modeling processes can be used to perform one or more functions (e.g., acquiring, processing, analyzing, and understanding various inputs in order to produce an output that includes numerical or symbolic information). For instance, such techniques can involve using computer-implemented models and algorithms (e.g., a convolutional neural network, a support vector machine, etc.) to simulate human decision-making. In one example, a computer system programmed with a machine-learning model can learn from training data and thereby perform a future task that involves circumstances or inputs similar to the training data. Such a computing system can be used, for example, to recognize certain individuals or objects in an image, to simulate or predict future actions by an entity based on a pattern of interactions to a given individual, etc.

SUMMARY

Various embodiments of the present disclosure provide systems and methods for automated historical risk assessment for risk mitigation in online access control. In one example, a method includes receiving a request for an assessment of a risk indicator change from a first risk indicator associated with an entity generated at a first time point to a second risk indicator associated with the entity generated at a second time point, wherein the first risk indicator and the second risk indicator are generated based on a plurality of attributes associated with the entity; identifying a third time point between the first time point and the second time point for which a third risk indicator associated with the entity has been determined; determining a first impact of each attribute of the plurality of attributes on a first risk indicator change from the first risk indicator to the third risk indicator; determining a second impact of each attribute of the plurality of attributes on a second risk indicator change from the third risk indicator to the second risk indicator; determining a total impact of each attribute of the plurality of attributes on the risk indicator change by aggregating the first impact and the second impact of each attribute; generating assessment results comprising a list of attributes selected from the plurality of attributes, the list of attributes ordered according to the respective total impact of the attributes; and transmitting, to a remote computing device, the assessment results in response to the request for the assessment for use in improving the risk indicator of the entity which is used to control access to one or more interactive computing environments by the entity.

In another example, a non-transitory computer-readable storage medium has program code that is executable by a processor device to cause a computing device to perform operations. The operations include receiving a request for an assessment of a risk indicator change from a first risk indicator associated with an entity generated at a first time point to a second risk indicator associated with the entity generated at a second time point, wherein the first risk indicator and the second risk indicator are generated based on a plurality of attributes associated with the entity; identifying a third time point between the first time point and the second time point for which a third risk indicator associated with the entity has been determined; determining a first impact of each attribute of the plurality of attributes on a first risk indicator change from the first risk indicator to the third risk indicator; determining a second impact of each attribute of the plurality of attributes on a second risk indicator change from the third risk indicator to the second risk indicator; determining a total impact of each attribute of the plurality of attributes on the risk indicator change by aggregating the first impact and the second impact of each attribute; generating assessment results comprising a list of attributes selected from the plurality of attributes, the list of attributes ordered according to the respective total impact of the attributes; and transmitting, to a remote computing device, the assessment results in response to the request for the assessment for use in improving the risk indicator of the entity which is used to control access to one or more interactive computing environments by the entity.

In another example, a system includes a processing device and a memory device in which instructions executable by the processing device are stored for causing the processing device to perform operations. The operations include receiving a request for an assessment of a risk indicator change from a first risk indicator associated with an entity generated at a first time point to a second risk indicator associated with the entity generated at a second time point, wherein the first risk indicator and the second risk indicator are generated based on a plurality of attributes associated with the entity; identifying a third time point between the first time point and the second time point for which a third risk indicator associated with the entity has been determined; determining a first impact of each attribute of the plurality of attributes on a first risk indicator change from the first risk indicator to the third risk indicator; determining a second impact of each attribute of the plurality of attributes on a second risk indicator change from the third risk indicator to the second risk indicator; determining a total impact of each attribute of the plurality of attributes on the risk indicator change by aggregating the first impact and the second impact of each attribute; generating assessment results comprising a list of attributes selected from the plurality of attributes, the list of attributes ordered according to the respective total impact of the attributes; and transmitting, to a remote computing device, the assessment results in response to the request for the assessment for use in improving the risk indicator of the entity which is used to control access to one or more interactive computing environments by the entity.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

FIG. 6 depicts yet another example of a user interface for displaying the impact of each attribute to a risk indicator change, according to certain aspects of the present disclosure.

DETAILED DESCRIPTION

Figure 1:
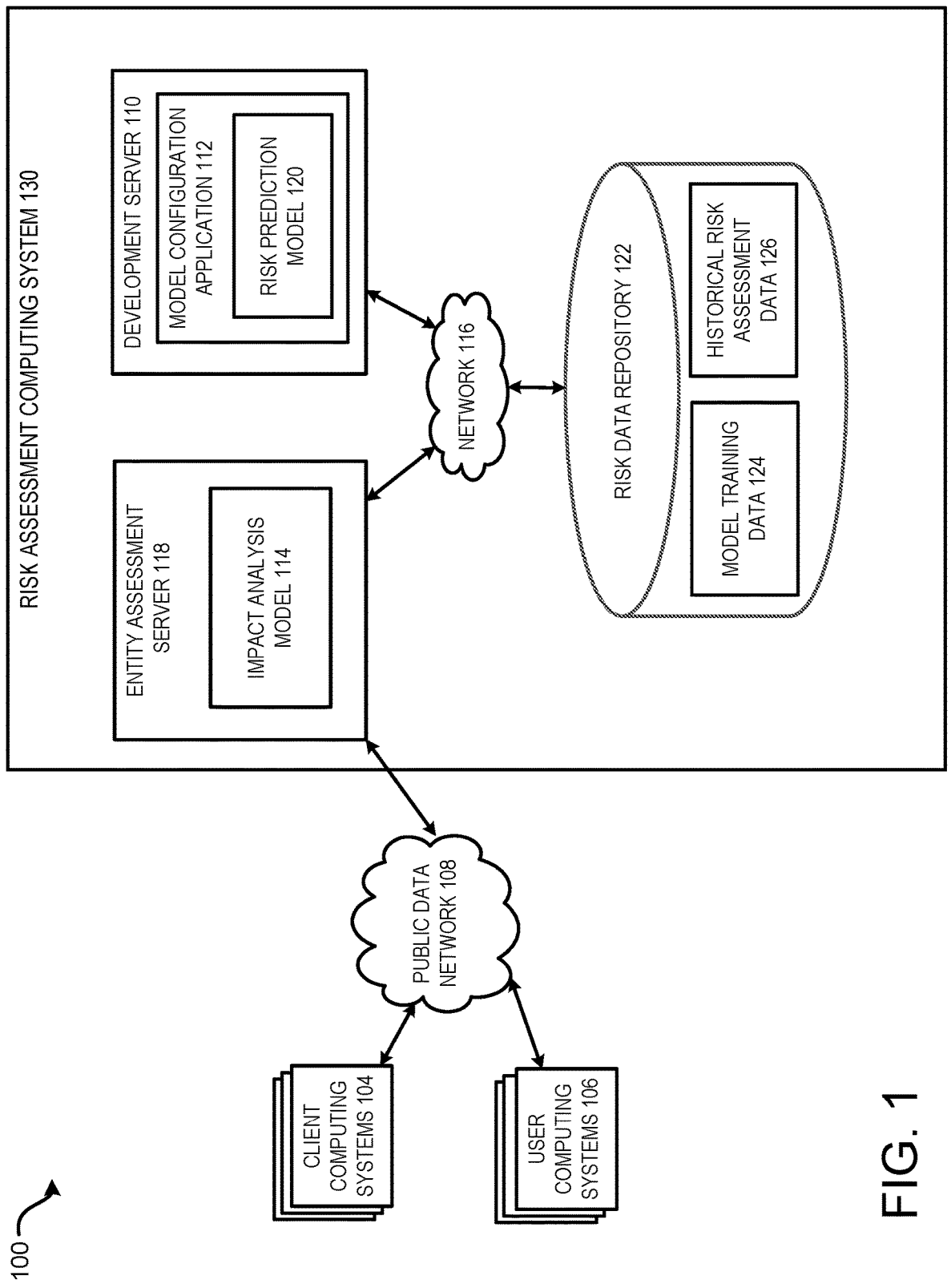
FIG. 1 is a block diagram depicting an example of a computing environment in which automated historical risk assessment is performed for risk mitigation in online access control, according to certain aspects of the present disclosure.

Certain aspects and features of the present disclosure involve automated historical risk assessment for risk mitigation in online access control. In one example, an entity assessment server can access historical risk indicators associated with an entity and perform a risk assessment for a risk indicator change over a time period. The risk indicator may be generated using a risk prediction model based on a set of attributes associated with the entity. The risk assessment can determine the impact of each of these attributes on the risk indicator change which can be presented systematically in a user interface facilitating the identification of the reason for the risk indicator change (risk increase or risk decrease) over the time period. The identified reason can be used by the entity to improve the risk indicator in the future to improve the chances of the entity to access an online computing environment.

For instance, an entity assessment server may receive, from a user device, a request for a risk assessment of a risk indicator change (e.g., a risk score change) associated with an entity over a period of time such as over three months. In one example, the risk indicator change may be a change from a risk indicator value Rs (such as a risk score value) at time Ts to a risk indicator value Re at time Te. Rs and Re may be determined by a risk prediction model based on attributes associated with the entity at time Ts and Te, respectively.

To perform the risk assessment, the entity assessment server may divide the time period [Ts, Te] into multiple evaluation time windows such as [Ts, T2], [T2, T3], and [T3, Te] (e.g., dividing a 3-month time period into three one-month evaluation time periods). The dividing time points, such as T2 and T3, have respective risk indicator values R2 and R3 associated therewith. In other words, a risk indicator has been determined for the entity at each dividing time point. For each evaluation time window [Ti, Tj], the entity assessment server can use an impact analysis model to determine the impact of each attribute to the risk indicator change from Ri to Rj. In some examples, the impact analysis model can be an integrated gradient model with the baseline set to the values of the attributes used to generate the risk indicator value Ri at time Ti. In further examples, the integrated gradient model is configured to follow a straight-line path to determine the impact of each attribute on the risk indicator change.

Continuing with this example, the determined impact of each attribute at different evaluation time windows can be aggregated to determine the overall impact of each attribute on the risk indicator change over the time period [Ts, Te]. The aggregation can include a linear combination or a non-linear combination of the determined impacts for an attribute at the different evaluation time windows. The overall impacts of the attributes can then be ordered and be used to select a list of attributes that mostly impact the risk indicator change from Rs to Re. This list of attributes can be included in the assessment results and sent to a remote computing device as a response to the request for the risk assessment.

The generated assessment results can be utilized in various applications to improve the operations of the corresponding systems. As an illustrative example, the assessment results may be used to improve the risk indicator (e.g., reduce the risk indicator value) associated with the entity at future time. For example, if the impact of an attribute is negative (i.e., the attribute increases the value of risk indicator during the time period Ts to Te), the entity may perform certain actions to modify the value of the attribute so that the predicted risk indicator decreases in the future. For instance, an attribute may be the amount of online storage resources occupied by a computing device in the past 3 months and the risk assessment shows that this attribute has the highest negative impact on the risk indicator change over the time period. To reduce the predicted risk indicator for future months, the computing device can release the online storage resources in the next month or next few months. The computing device may be configured to perform other operations in order to improve the risk prediction. In further examples, the computing device may be configured to automatically perform these actions in response to receiving the assessment results.

Furthermore, the assessment results can also be utilized to improve the risk prediction model to prevent malicious entities from achieving the desired target risk score thereby obtaining access to the interactive computing environment. For example, if the assessment results show that a better assessment risk score can be achieved without substantive changes on the side of the entity (e.g., by merely changing values of less important attributes such as the location of a device used to access the interactive computing environment), the risk prediction model can be revised to assign lower weights to those attributes or remove those attributes from the inputs to the risk prediction model. In other examples, the risk indicator of an entity generated by the risk prediction model may indicate the likelihood of failure of one or more components in an industrial environment associated with the entity. The generated assessment results can be used to determine instructions to the entity to reduce the likelihood of failure.

As described herein, certain aspects provide improvements to risk assessment in online access control and other fields where risks associated with entities are involved. Compared with existing risk prediction models which only provide a predicted risk score associated with an entity without providing detailed assessment as to the impact of each attribute on the risk score change from one time point to another time point, the technologies presented herein can determine the detailed contribution or impact of each attribute on the risk score change, which may be used to determine the actions for improving the security or stability of the system associated with the entity. Further, the assessment results can also be utilized to improve the accuracy of the risk prediction model by identifying attributes that should be deemphasized or removed from the risk prediction model inputs.

Additional or alternative aspects can implement or apply rules of a particular type that improve existing technological processes involving risk assessment. For instance, to find the impact of the attributes on the risk score change from a first risk score to a second risk score, a particular set of rules are employed in the risk assessment process, such as the rules for dividing the time period into multiple evaluation time widows and using the straight-line path for assessment, the rules for using the attributes corresponding to the risk score of the entity at a previous time point as the baseline for analysis, and other rules. These particular rules enable the algorithm to be performed efficiently, i.e., the process can be completed faster by repeating the same process for each evaluation time window. In addition, using the entity's own previous data as the baseline, the determined impacts of the attributes are more meaningful in providing insights to the improvement of the risk scores and the risk prediction model.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example

Referring now to the drawings, FIG. 1 is a block diagram depicting an example of a computing environment 100 in which automated historical risk assessment is performed for risk mitigation in online access control. A risk assessment computing system 130 in the computing environment 100 can generate assessments results that include a list of attributes ordered according to the respective impacts of the attributes. In some aspects, the risk assessment computing system 130 may generate recommendations for improving a risk indicator or other analytical or predictive outputs. FIG. 1 depicts examples of hardware components of a risk assessment computing system 130, according to some aspects. The risk assessment computing system 130 is a specialized computing system that may be used for processing large amounts of data using a large number of computer processing cycles. The risk assessment computing system 130 can include a development server 110 for building, training, or otherwise modifying a risk prediction model 120. In some aspects, the risk prediction model 120 may use logistic regression to make predictions with respect to values for the risk indicator associated with an entity. For example, the risk prediction model 120 can include a logistic regression model as defined as equation (1) shown below:

$$y=F(x)=\beta_0+\beta_1 x_1+\beta_2 x_2+ \ldots +\beta_n x_n \quad (1)$$

where $y$ represents log-odds associated with the risk indicator; $x_i$'s represent independent variables; and $\beta_i$'s represent coefficients. The risk prediction model 120 may have a positive association with the log-odds such that higher log-odds correlate to a higher risk indicator value. To determine attributes associated with an entity, a respective contribution of each variable can be calculated with respect the log-odds before ranking the contributions. If the logistic regression model is linear and additive, the respective contribution of $x_i$ to the log-odds can be $\beta_i x_i$.

In additional aspects, $\beta_i x_i$ can be defined using equation (2) shown below:

$$\beta_i x_i = F(x) - F(x|_{x_i=0}) \quad (2)$$

such that if contribution of all variables except $x_i$ are removed, the residual effect can be attributed to $x_i$. F represents the logistic regression model. In such examples, the contribution of all individual variables to an output can be defined as "attribution". In some examples, the risk prediction model may be a neural network model, a decision tree, or other types of models.

For a function F, defined below as equation (3), which may represent a neural network model:

$$F: R^n \rightarrow [0,1] \quad (3)$$

with an input x defined in equation (4) below:

$$x=(x_1, \ldots, x_n) \in R^n, \quad (4)$$

an attribution of a prediction at input x relative to a baseline input x' can be defined using equation (5) below:

$$A_F(x,x')=(\alpha_1, \ldots, \alpha_n) \in R^n \quad (5)$$

where $\alpha_i$ is the contribution of $x_i$ to the prediction $F(x)$. The neural network may include more than one attribute that feeds to at least one hidden layer with ReLU activation functions. The hidden layer can feed to an output layer with sigmoid activation function for prediction capabilities. Early stopping can be applied to avoid over-fitting for the neural network.

In some aspects, the neural network can be trained with a non-negativity constraint on training data to generate a trained feed-forward neural network that is monotonically constrained. Under the monotonic constraint, the output of the neural network is monotonic with respect to each input attribute. In other words, as the value of an input attribute increases, the value of the output always increases (or decreases). During the training, the training data can be split into one or more training sets, one or more validation sets, one or more test sets, or any combination thereof. As an illustrative example, the training data can be split into a training, validation, and test split with 80:10:10 ratio such that splits include the same class ratio (e.g., 75:25). The splitting may follow a k-fold cross-validation rule, a leave-one-out-rule, a leave-p-out rule, or a holdout rule.

The development server 110 can include one or more processing devices that execute program code, such as a model configuration application 112. The program code is stored on a non-transitory computer-readable medium. The model configuration application 112 can execute one or more processes to train and optimize the risk prediction model 120 (e.g., a neural network, a decision tree, etc.) for generating analytical or predictive outputs (e.g., risk indicator values) based on one or more input variables, such as attributes that describe an entity. During training, training data can be iteratively supplied to the risk prediction model 120 to enable the risk prediction model 120 to identify patterns related to the training data or to identify relationships between the training data and output data, such as the risk indicators.

In some embodiments, the model configuration application 112 can build and train the risk prediction model 120 utilizing model training data 124, which includes training attribute data and training risk assessment data. The attribute data can include, for example, attribute vectors. An attribute vector can be a vector having, as its elements, values of different attributes that describe (or are otherwise associated with) an entity, such as an individual, an organization, a device, a system or a component. The risk assessment data can include, for example, data identifying a certain outcome associated with the attribute data, data identifying a risk assessment associated with the attribute data, etc. As an illustrative example, risk assessment data can identify certain outcomes, such as a default on a loan, and an attribute vector can include values for attributes associated with the outcomes, such as a number of credit lines held by an entity prior to or during the default, a percentage of credit utilization by the entity prior to or during the default, etc. Model training data 124 data can be used by the model configuration application 112 to build, train, or otherwise modify the risk prediction model 120.

Historical risk assessment data 126 can include risk indicators generated by the trained risk prediction model 120 in the past for entities along with the historical attribute data used to generate the corresponding risk indicators. A historical attribute vector can be an attribute vector with historical attribute data that is gathered from interactions with one or more client computing systems 104, one or more user computing systems 106, or both. The historical risk assessment data 126 and the model training data 124 can be stored in one or more network-attached storage units on which various repositories, databases, or other structures are stored. Examples of these data structures are the risk data repository 122.

Network-attached storage units may store a variety of different types of data organized in a variety of different ways and from a variety of different sources. For example, the network-attached storage unit may include storage other than primary storage located within the development server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices.

The entity assessment server 118 can include one or more processing devices that execute program code, such as the impact analysis model 114. The program code is stored on a non-transitory computer-readable medium. The impact analysis model 114 can execute one or more processes to utilize the risk prediction model 120 trained by the model configuration application 112 to generate, based on input attribute data, an analytical or predictive output, such as assessment results associated with an assessment of a risk indicator change or a recommendation with respect to the assessment results (e.g., a recommended set of actions for improving a risk indicator).

The risk assessment computing system 130 can further include an entity assessment server 118, which can execute an impact analysis model 114 that utilizes a trained risk prediction model 120 and attribute data from a risk data repository 122 to determine an impact of each attribute from a set of attributes associated with an entity. In additional aspects, the impact analysis model 114 may generate one or more recommendations with respect to one or more entities to improve (e.g., reduce a risk indicator value) a respective risk indicator associated with the entities at a future time. The impact analysis model 114 may include an integrated gradient model that uses integrated gradients to determine the impact of each attribute. In some aspects, each attribute can be constrained to have a positive monotonic trend with respect to the risk indicator. Integrated gradients can be defined as a path integral of gradient components along a straight-line path from a baseline to an input. An integrated gradient along an i-th dimension for an input x with respect to a baseline x' can be defined as equation (6) shown below:

$$IG_i(x) = (x_i - x'_i) \times \int_{\alpha=0}^{1} \frac{\partial F(x' + \alpha * (x - x'))}{\partial x_i} da \qquad (6)$$

where $$\frac{\partial F(x)}{\partial x_i}$$

is the partial derivative of F(x) along the i-th dimension. In some aspects, the integrated gradient can be approximated by Riemman sums as shown in equation (7) below:

$$IG_i^{appr}(x) = (x_i - x'_i) \times \frac{1}{m} \sum_{k=1}^{m} \frac{\partial F\left(x' + \frac{k}{m} * (x - x')\right)}{\partial x_i} \qquad (7)$$

Furthermore, the risk assessment computing system 130 can communicate with various other computing systems, such as client computing systems 104. For example, client computing systems 104 may send risk assessment queries, recommendation requests, or both to the entity assessment server 118 for risk assessment, or may send signals to the entity assessment server 118 that control or otherwise influence different aspects of the risk assessment computing system 130. The client computing systems 104 may also interact with user computing systems 106 via one or more public data networks 108 to facilitate electronic transactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other providers of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, etc.

The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the client computing system 104 to be performed.

A user computing system 106 can include any computing device or other communication device operated by a user, such as a consumer or a customer. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104, to engage in mobile commerce with a client computing system 104, to obtain controlled access to electronic content hosted by the client computing system 104, etc.

For instance, the user can use the user computing system 106 to engage in an electronic transaction with a client computing system 104 via an interactive computing environment. An electronic transaction between the user computing system 106 and the client computing system 104 can include, for example, the user computing system 106 being used to request online storage resources managed by the client computing system 104, acquire cloud computing resources (e.g., virtual machine instances), and so on. An electronic transaction between the user computing system 106 and the client computing system 104 can also include, for example, query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the risk assessment computing system 130 for risk assessment. Based on the risk indicator predicted by the entity assessment server 118, the client computing system 104 can determine whether to grant the access request of the user computing system 106 to certain features of the interactive computing environment.

In a simplified example, the risk assessment computing system 130 can configure a neural network to be used for accurately determining risk indicators (e.g., credit scores) using entity attributes, determining adverse action codes or other explanation codes for the entity attributes, computing recommendations for modifying the risk indicators, or some combination thereof. An entity attribute can be any variable predictive of risk that is associated with an entity. Any suitable entity attribute that is authorized for use by an appropriate legal or regulatory framework may be used.

Examples of predictor variables used for predicting the risk associated with an entity accessing online resources include, but are not limited to, variables indicating the demographic characteristics of the entity (e.g., name of the entity, the network or physical address of the company, the identification of the company, the revenue of the company), variables indicative of prior actions or transactions involving the entity (e.g., past requests of online resources submitted by the entity, the amount of online resource currently held by the entity, and so on), variables indicative of one or more behavioral traits of an entity (e.g., the timeliness of the entity releasing the online resources), etc. Similarly, examples of predictor variables used for predicting the risk associated with an entity accessing services provided by a financial institute include, but are not limited to, indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc.

The predicted risk indicator can be utilized by the service provider to determine the risk associated with the entity accessing a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

In further examples, the entity associated with the user computing systems, the service provider associated with the client computing systems 104, or another system or entity (e.g., the risk assessment computing system 130) can request an impact analysis to be performed by the entity assessment server 118 to determine the impact of the attributes on the risk indicator changes in the past. The entity assessment server 118 can generate the assessment results as discussed above. As discussed above, the generated assessment results can be utilized in various applications to improve operations of corresponding systems. In some aspects, the assessment results may be provided to the entity such that the entity can reduce a corresponding risk indicator value at a future time. The entity can perform one or more actions to modify the impact associated with a specific attribute such that the risk indicator decreases in the future. In additional or alternative aspects, the user computing system 106 may automatically perform remedial actions based on the assessment results to improve the risk indicator value. In other examples, the assessment results may be used to improve the risk prediction model 120, or be used by the client computing systems 104 to assess the security of the online interactive computing environment.

Each communication within the computing environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. Examples of wireless interfaces can include IEEE 802.11, Bluetooth, or radio interfaces for accessing cellular telephone networks (e.g., transceiver/antenna for accessing a CDMA, GSM, UMTS, or another mobile communications network). A wired network may include a wired interface, such as Ethernet, USB, IEEE 1394, or a fiber optic interface. The wired or wireless networks may be implemented using routers, access points, bridges, gateways, or the like, to connect devices in the data network.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the development server 110 and the entity assessment server 118, may be instead implemented in a single device or system.

Figure 2:
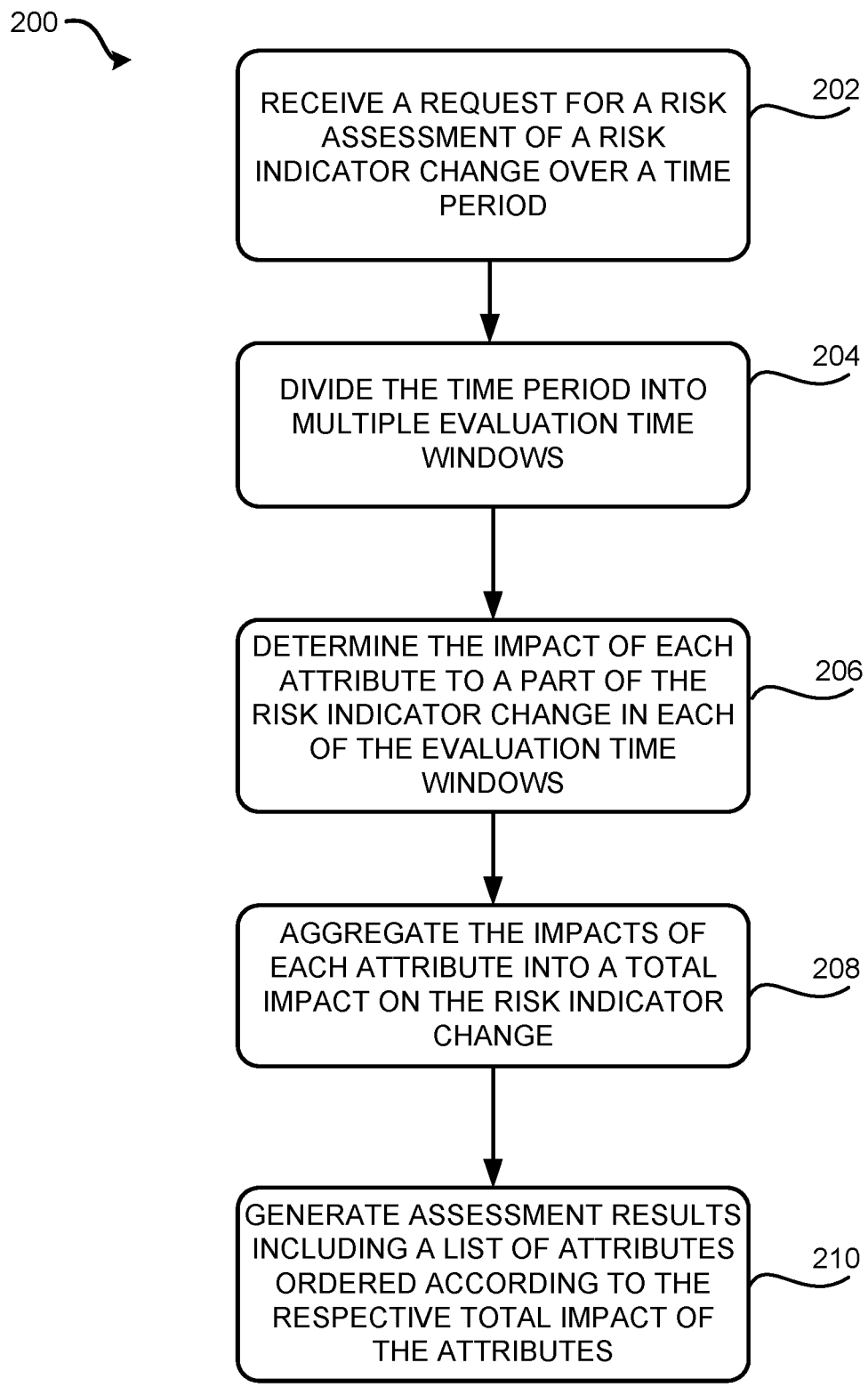
FIG. 2 is a flow chart depicting an example of a process for an automated historical risk assessment for risk mitigation in online access control, according to certain aspects of the present disclosure.

FIG. 2 is a flow chart depicting an example of a process 200 for an automated historical risk assessment for risk mitigation in online access control. For illustrative purposes, the process 200 is described with reference to implementations described with respect to various examples depicted in FIG. 1. Other implementations, however, are possible. The operations in FIG. 2 are implemented in program code that is executed by one or more computing devices, such as the impact analysis model 114 that is executed by an entity assessment server 118. In some aspects of the present disclosure, one or more operations shown in FIG. 2 may be omitted or performed in a different order. Similarly, additional operations not shown in FIG. 2 may be performed.

At block 202, the process 200 involves receiving a request for a risk assessment of a risk indicator change over a time period. The entity assessment server 118 can execute the impact analysis model 114 and thereby perform one or more operations to determine an impact associated with each attribute for the risk indicator change. For example, the entity assessment server 118 can establish or join a communication session with a remote computing device, such as a client computing system 104 or a user computing system 106. The entity assessment server 118 can receive the request for a risk assessment of the risk indicator change over a specified time period. In some aspects, the request includes data that identifies or can be used to identify a particular entity. Examples of this data include the name of an entity, an identifier of a record in which data about the entity is stored, etc.

At block 204, the process 200 involves dividing the time period into multiple evaluation time windows. Dividing the time period into the multiple evaluation time windows can occur based on a set of rules employed in the risk assessment process. For example, the time period may be divided based on a per-month basis, a per-week basis, etc. The set of rules may include dividing the time period into the evaluation time windows such that each evaluation time window has a same time duration. In alternative aspects, each evaluation time window for the time period may have different time durations. For example, if a time period is three months, the time period may be divided into a first evaluation time window corresponding to one month and a second evaluation time window corresponding to two months.

Figure 3:
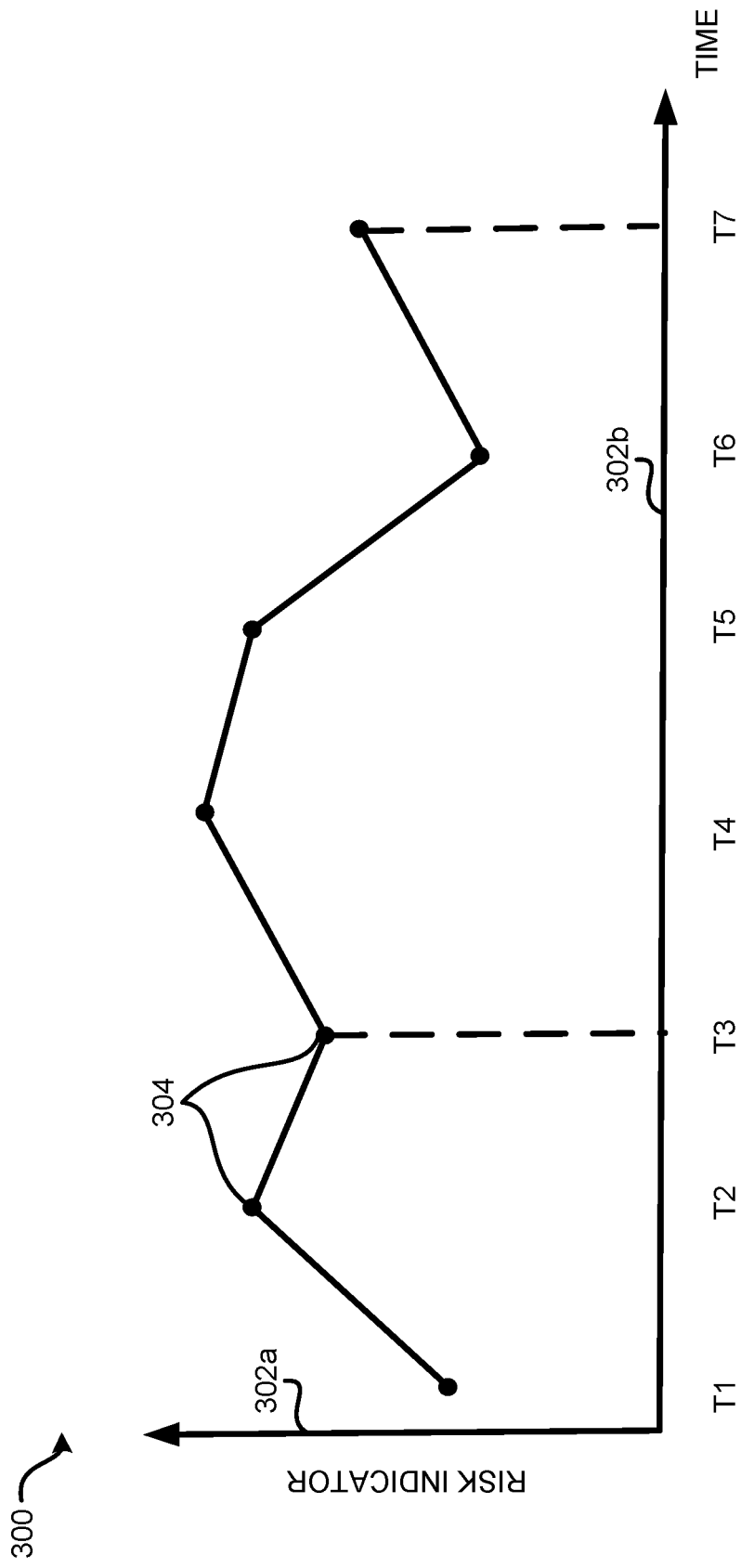
FIG. 3 is a data chart depicting historical risk indicator values determined at different time points over a period of time.

One example of the time period is shown in FIG. 3, which is a data chart 300 depicting historical risk indicator values determined at different time points over a period of time. A first axis 302a of the data chart 300 corresponds to risk indicator values, while a second axis 302b of the data chart 300 corresponds to the time passed. In some aspects, the data chart 300 can include one or more data points 304 for a risk indicator value and a corresponding time. As shown, each evaluation time window may correspond to a respective risk indicator change (e.g., a risk increase or a risk decrease). For example, the time period depicted by FIG. 3 can be selected to start at a first time point (e.g., T3) and end at a second time point (e.g., T7).

To divide the time period into a first evaluation time window and a second time evaluation window, the first evaluation time window may end at any time point (e.g., T4, T5, or T6) between the first time point and the second time point. In some aspects, the first evaluation time window may be associated with a first risk indicator change that is opposite of a second risk indicator change for the second evaluation time window. For example, if the first evaluation time window spans from T3 to T5, the first risk indicator change may correspond to a risk increase, while the second risk indicator change associated with the second time evaluation window may be a risk decrease. In alternative aspects, the first evaluation time window and the second evaluation may be associated with a similar risk indicator change. For example, the first evaluation time window and the second evaluation time window may both have a risk indicator change associated with a risk increase.

Referring back to FIG. 2, at block 206, the process 200 involves determining the impact of each attribute to a part of the risk indicator change in each evaluation time period. In some aspects, a respective impact for each attribute can be determined using the impact analysis model 114 which may include an integrated gradients model discussed above. In such examples, the integrated gradients model may have different choices of baseline to use in determining the impact. The choices of the baseline can include a zero signal baseline, a decision boundary baseline, or a historical baseline. The zero signal baseline can represent a theoretical ideal entity with a risk indicator value close to zero. For example, if the risk indicator represents a credit score, the zero signal baseline can be an input close to or equal to the input of an ideal credit score of 850. Determining the zero signal baseline can involve averaging a predetermined number of entities with the lowest risk indicator values. In some aspects, the zero signal baseline may be referred to as a zero baseline.

In some aspects, the decision boundary baseline can involve one or more decision boundaries that form at least one decision boundary band based on the decision boundary baseline. The decision boundary baseline may be set by the user computing system 106 or another suitable computing system in the computing environment 100 to function as a threshold for the risk indicator. In some aspects, the decision boundary band based on the decision boundary baseline can indicate a range of potential allowability such that entities within the decision boundary band are relatively likely to obtain access permission from the client computing system 104. For example, if the decision boundary band is set by a financial institution, the decision boundary band can represent a range within which entities are likely to be eligible for a loan, a credit line, etc. In additional aspects, an entity having a corresponding risk indicator that exceeds a decision boundary may cause the client computing system 104 to deny access permission for the user computing system 106. In alternative aspects, the client computing system 104 can grant access permission based on the risk indicator being below the decision boundary.

The historical baseline can represent an input to a past risk indicator value for the entity, thereby enabling relatively meaningful results for the entity from analyzing the risk indicator change. For example, implementing the historical baseline can generate assessment results that provide insight regarding contribution of specific attributes to the risk indicator change. In some aspects, the historical baseline can be adjusted based on a respective evaluation time window. As an illustrative example, if the time period spans from June to August in one year, calculating a first impact for each attribute during a first evaluation time window can involve implementing a first dataset for June as the historical baseline and a second dataset for July as input data. In such an example, calculating a second impact for each attribute during a second evaluation time window may involve using the second dataset for July as the historical baseline and a third dataset for August as the input data. Based on the historical baseline and the input data, integrated gradients can be computed along a straight-line path or any other path.

At block 208, the process 200 involves aggregating the impact of each attribute into a total impact on the risk indicator change. Aggregating the impact can include a linear combination or a non-linear combination of determined impacts for an attribute at different evaluation time windows. In some aspects, the determined impacts for each attribute at different evaluation time windows can be summed to generate an aggregated impact for each attribute. For example, the first impact and the second impact for each attribute can be added together to determine a total impact of each attribute with respect to the risk indicator change.

At block 210, the process 200 involves generating assessment results that include a list of attributes that are ordered according to the respective total impact of the attributes. The list of attributes can include a first subset of attributes that increase the risk indicator and a second subset of attributes that decrease the risk indicator. A specific attribute may increase or decrease the risk indicator depending on a magnitude associated with the specific attribute. For example, a relatively high percentage for satisfactory data transfer to total data transfer within one week may decrease the risk indicator. Communications within the computing environment 100 can involve data transfer associated with exchanging files between computing systems (e.g., the client computing system 104 or the user computing system 106) in the computing environment 100. The files can include data associated with determining the risk indicator, the impact of each risk indicator, or a combination thereof. In some aspects, the data transfer can facilitate electronic transactions between interactive computing environments provided by the client computing systems 104 and entities of the user computing systems 106. Conversely, a relatively low percentage for satisfactory data transfer to total data transfer within one week can indicate that data transfer loss is occurring. In some aspects, the data transfer loss can result from a security breach or another suitable security compromise, thereby increasing the risk indicator due to increased risk associated with the entities interacting with the client computing systems 104.

Changing the baseline implemented in the integrated gradients model can affect the order for the list of attributes. For example, using the historical baseline can result in relatively higher impact for attributes that are short term (e.g., within days or weeks). In some aspects, the assessment results can be transmitted to a remote computing device, such as the user computing system 106, such that an entity associated with the user computing system 106 can use the assessment results to improve a corresponding risk indicator.

A user interface can be output to a display of the remote computing device to present the assessment results to the entity. Examples of the user interface are described below with respect to FIGS. 4-6. The user interface can specify a respective weight for each attribute contributing to the risk indicator change, enabling the entity to better understand the impact for each attribute and any improvements thereto automatically made by the remote computing device. In some aspects, a software application can be installed on the user computing system 106 to cause the user computing system 106 to automatically perform remedial actions based on the assessment results. By performing the remedial actions, the risk indicator can be improved for a future time. For example, if an attribute with highest impact is associated with unaddressed vulnerabilities, the software application may include a vulnerability scanner to identify the unaddressed vulnerabilities. Accordingly, the user computing system 106 may automatically address vulnerabilities detected by the vulnerability scanner, such as by suppressing deferrable vulnerabilities or by applying available solutions (e.g., software updates, patches, etc.). After addressing the vulnerabilities, the risk indicator value may decrease which corresponds to a decrease in risk associated with the entity interacting (e.g., accessing online services, engaging in mobile commerce, etc.) with the client computing system 104.

Figure 4:
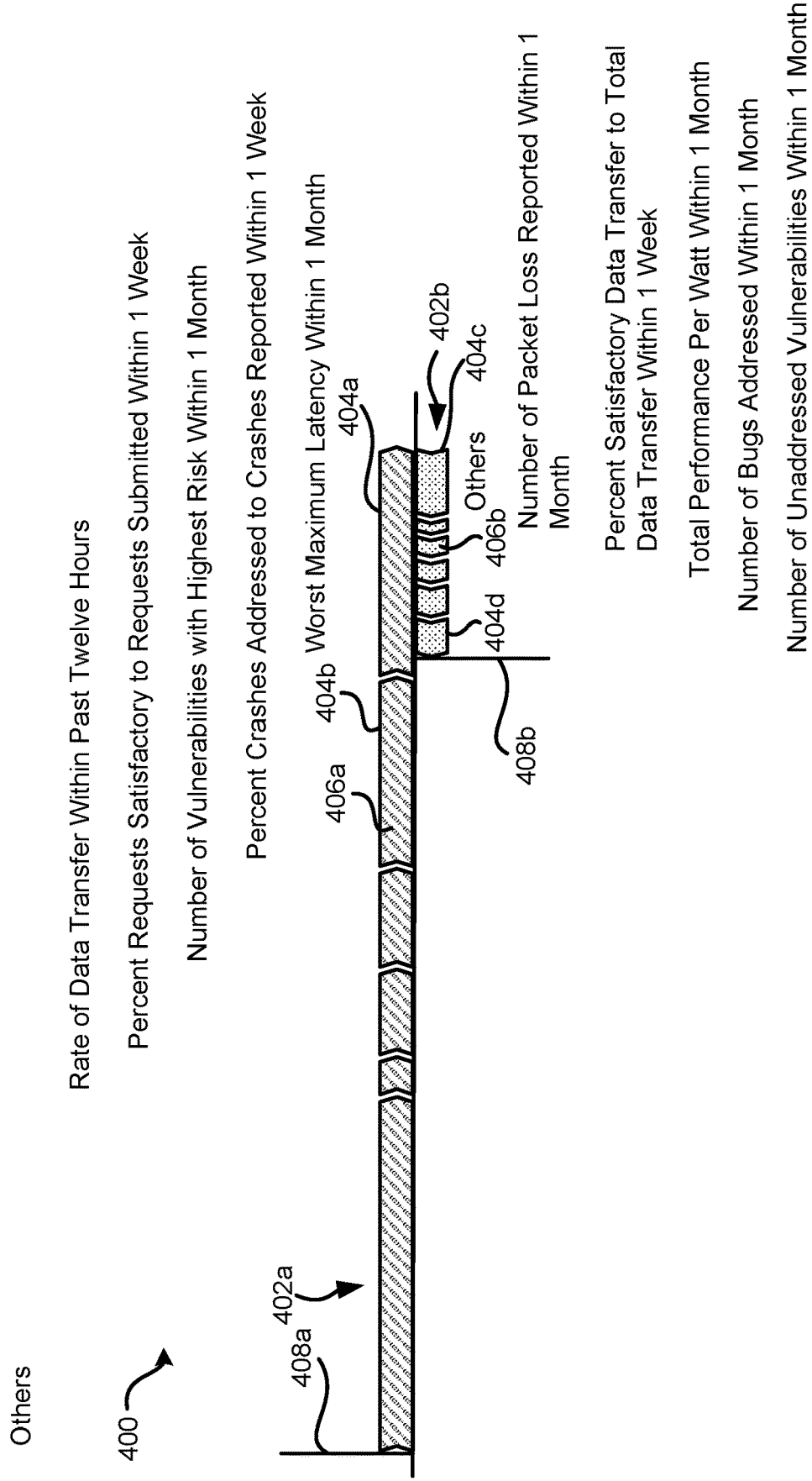
FIG. 4 depicts an example of a user interface for displaying the impact of each attribute to a risk indicator change, according to certain aspects of the present disclosure.

FIG. 4 depicts an example of a user interface 400 for displaying the impact of each attribute to a risk indicator change, according to certain aspects of the present disclosure. The user interface 400 may be generated by the entity assessment server 118 or another computing device in the risk assessment computing system 130. The user interface 400 may be presented in the user computing system 106, another suitable computing system of the computing environment 100, or any suitable combination thereof. This example is intended to be illustrative and non-limiting. Other examples may include more graphical features, fewer graphical features, different graphical features, or a different configuration of graphical features than is shown in FIG. 4.

The user interface 400 can include a first stack 402a of visual segments 404 with a first visual adjustment 406a and a second stack 402b of visual segments 404 with a second visual adjustment 406b. As depicted in FIG. 4, the first stack 402a is positioned above the second stack 402b but other positions relative to the second stack 402b, such as below or to a side, can be possible. The first visual adjustment 406a corresponds to a negative impact for a risk indicator, while the second visual adjustment 406b corresponds to a positive impact for the risk indicator. For example, if a relatively high magnitude for the risk indicator indicates high risk, the first visual adjustment 406a can represent a first subset of attributes that increases the risk indicator, whereas the second visual adjustment 406b may represent a second subset of attributes that decreases the risk indicator. In some aspects, the visual adjustments 406 may vary for each visual segment 404 to correspond to the impact for each visual segment 404. For example, a saturation value for a respective visual adjustment to each visual segment 404 may increase to correspond to a magnitude of impact for each visual segment 404. Using the visual adjustments 406, an entity can relatively quickly differentiate a type of impact represented by each stack 402 for the risk indicator change.

A first graphical element 408a, such as a vertical line, can be positioned in the user interface 400 to represent a baseline value for the risk indicator, such as a first risk indicator at a first time point. In some aspects, the baseline value may be associated with an ideal entity with a relatively low risk score. In alternative aspects, the first visual indicator can represent a previous risk score or a historical risk score for an entity. The user interface 400 can include a second graphical element 408b that represents an input value for the risk indicator, such as a second risk indicator at a second time point. The input value can be a current value or a past value for the risk indicator that is compared to the baseline value to calculate the risk indicator change. For example, the input value can be a current credit score for an entity that is compared to a historical credit score for the entity as the baseline value to determine a risk indicator associated with a likelihood of the entity defaulting on a loan. The first stack 402a and the second stack 402b can be arranged such that a start of the first stack 402a indicates the first risk indicator while an end of the second stack 402b indicates the second risk indicator. In additional aspects, an end of the first stack 402a and a start of the second stack 402b can indicate a same risk indicator value.

In some aspects, the first stack 402a can include a first directionality, such as pointing to a right side of the user interface 400. The second stack 402b can include a second directionality that is in an opposite direction from the first directionality. The directionality of the first stack 402a and the second stack 402b can visualize how each stack 402 contributes to the risk indicator change. For example, the negative impact represented by the first stack 402a and the positive impact represented by the second stack 402b contribute to the risk indicator change such that the risk indicator changes from the baseline value to the input value.

Each visual segment 404 in each stack 402 can represent an attribute associated with the risk indicator change. A relative size of a respective visual segment 404 in each stack can be proportional to an impact of the respective visual segment 404 to the risk indicator change. For example, an entity can determine using the relative size of a first visual segment 404a and a second visual segment 404b in the first stack 402a that the first visual segment 404a contributes more to the risk indicator change than the second visual segment 404b. In additional aspects, the visual segments 404 for each stack 402 can be ordered based on the impact of each visual segment 404 to the risk indicator change. For example, the second stack 402b can be displayed with the impact associated with each visual segment 404 in descending order from left to right such that the impact is highest for a third visual segment 404c at a left end and lowest for a fourth visual segment 404d at a right end. Ordering the visual segments 404 based on a respective impact for each visual segment 404 can enable the entity to relatively quickly determine which attributes have highest impact and lowest impact. The user interface 400 can include one or more respective visual segments 404 corresponding to attributes with relatively high impact to the risk indicator change and can combine remaining attributes into one visual segment. As depicted in FIG. 4, the user interface 400 can display the first stack 402a with a total of six visual segments such that five visual segments 404 correspond to respective attributes with relatively high impact to the risk indicator change.

Figure 5:
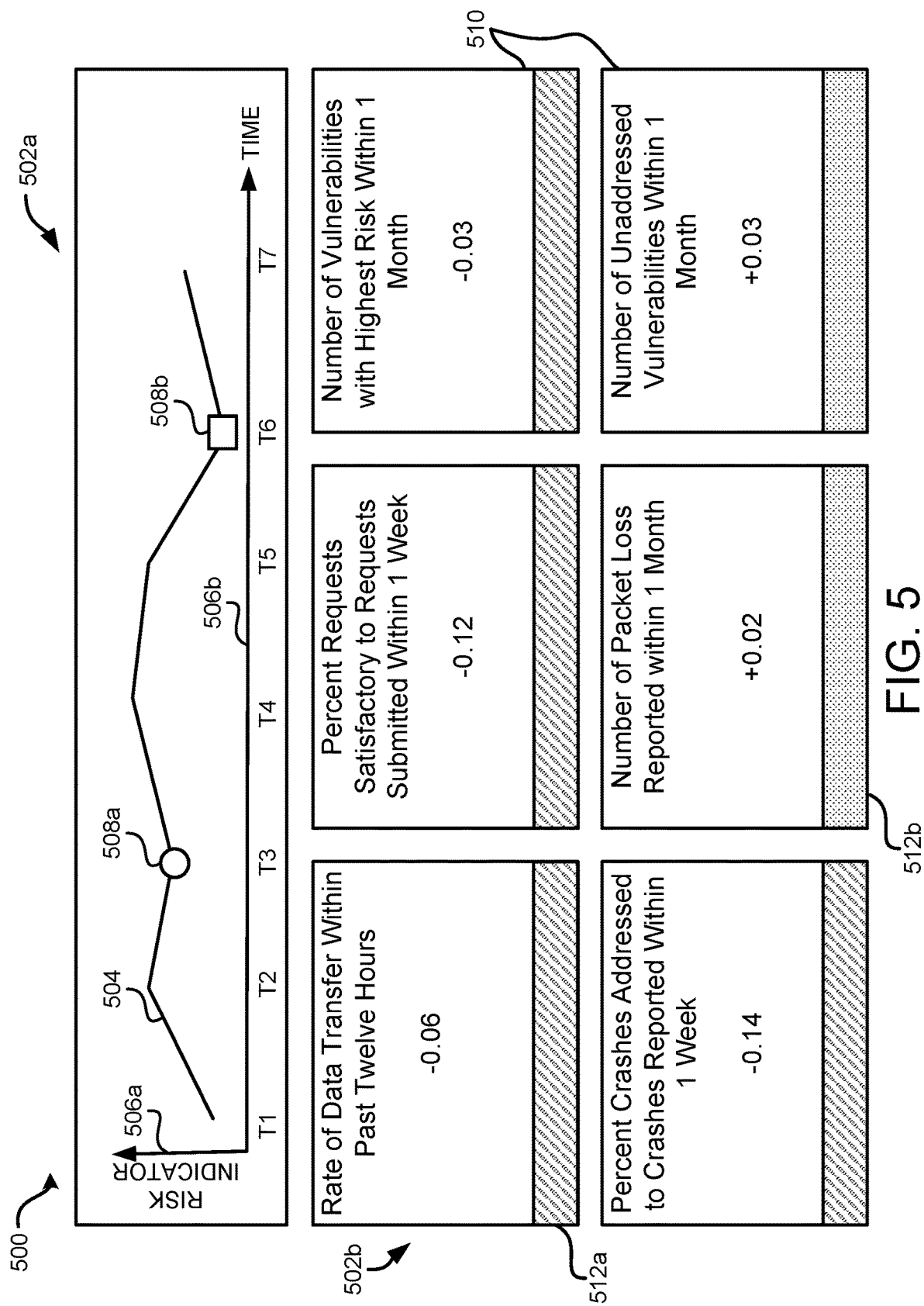
FIG. 5 depicts another example of a user interface for displaying the impact of each attribute to a risk indicator change, according to certain aspects of the present disclosure.

FIG. 5 depicts another example of a user interface 500 for displaying the impact of each attribute to a risk indicator change, according to certain aspects of the present disclosure. The user interface 500 may be generated by the entity assessment server 118 or another computing device in the risk assessment computing system 130. The user interface 500 may be presented in the user computing system 106, another suitable computing system of the computing environment 100, or any suitable combination thereof. This example is intended to be illustrative and non-limiting. Other examples may include more graphical features, fewer graphical features, different graphical features, or a different configuration of graphical features than is shown in FIG. 5.

The user interface 500 can include a first field 502a displaying the risk indicator change over a time period. The first field 502a can display a plot 504 of a set of risk indicator values over a time period. The plot 504 can include magnitude of the risk indicator values on a first axis 506a and time on a second axis 506b. In some aspects, the user interface 500 can be interactive such that an entity can select one or more time points to receive information associated with a corresponding risk indicator change. For example, the entity interacting with the user interface 500 may select at least two time points, such as a start time and an end time, on the user interface 500. The start time can correspond to a baseline value for a risk indicator, while the end time can correspond to an input value for the risk indicator. The input value may be a current value or a past value after the baseline value for the risk indicator. The time points can specify a particular risk indicator change over a particular time period.

In some aspects, a first graphical element 508a can represent a first point associated with the start time and a corresponding risk indicator in the plot 504. Similarly, a second graphical element 508b can represent a second point in the plot associated with the end time and the corresponding risk indicator. The graphical elements 508 may include different shapes (e.g., squares, circles, etc.), colors, patterns, hues, or other suitable visual means for differentiating the first point from the second point. Including the graphical elements 508 in the user interface 500 can enable the entity to easily define the time points and corresponding risk indicator values for the risk indicator change.

In some aspects, the user interface 500 additionally can include a second field 502b to display a total impact of each attribute in a list of attributes associated with the risk indicator change. As depicted in FIG. 5, the second field 502b can be positioned below the first field 502a but may alternatively be positioned above or to a side of the first field 502a. The user interface 500 may detect that the entity selected the time points and generate the second field 502b that provides more details about the risk indicator change, such as a respective impact for each attribute contributing to the risk indicator change. For example, the second field 502b can include one or more sections 510 corresponding to a respective attribute related to the risk indicator change.

The sections 510 may represent a subset of the attributes that have relatively higher impact on the risk indicator change over the time period. In such examples, the subset of the attributes included in the user interface 500 may differ for each entity. In some aspects, the subset of the attributes can be selected from the list of attributes that is ordered based on a respective impact of each attribute. For example, to determine the subset of the attributes, a predetermined number of the attributes can be selected from a start of an ordered list of attributes such that the predetermined number of the attributes have relatively higher impact on the risk indicator change. In alternative aspects, at least one of the sections 510 may be pre-selected such that one or more attributes is the same for each entity accessing the user interface 500. In additional or alternative aspects, the sections 510 may be arranged such that attributes are grouped based on a respective impact on the risk indicator change. The predetermined number of attributes can be selected from a first set of attributes with negative impact on the risk indicator change and from a second set of attributes with positive impact on the risk indicator change to generate the subset of the attributes. For example, a first subset of attributes with a negative impact on the risk indicator change can be displayed at a top row, while a second subset of attributes with a positive impact on the risk indicator can be displayed below the first set of attributes.

One or more visual indicators 512 can be associated with each section 510 to categorize the impact of a corresponding attribute to the risk indicator change. The visual indicator 512 may involve color, patterns, shapes, or other suitable visual changes to the sections 510. In some aspects, the visual indicator 512 may affect text or other suitable content in the sections 510. For example, a first visual indicator 512a may include a red color to indicate that the corresponding attribute has a negative impact on a risk indicator, while a second visual indicator 512b may include a green color to indicate that the corresponding attribute has a positive impact on the risk indicator. Including the visual indicators 512 can enable an entity viewing the user interface 500 to readily distinguish a first attribute subset with positive impact from a second attribute subset with negative impact. In additional or alternative aspects, the visual indicators 512 may indicate a priority associated with improving the risk indicator for the entity. For example, addressing a first attribute corresponding to a first visual indicator 512a may improve the risk indicator more quickly compared to a second attribute corresponding to a second visual indicator 512b. As an illustrative example, if the risk indicator represents a credit score, improving payment history may improve the credit score more quickly than increasing credit history length. The priority can be assigned based on a rank of a respective attribute with respect to the ordered list of attributes. For example, if a ranking system for the list of ordered attributes involves one being the highest rank and five being the lowest rank, a first attribute ranked as one can have a higher priority or a higher impact on the risk indicator change than a second attribute ranked as five.

FIG. 6 depicts yet another example of a user interface 600 for displaying the impact of each attribute to a risk indicator change, according to certain aspects of the present disclosure. The user interface 600 may be generated by the entity assessment server 118 or another computing device in the risk assessment computing system 130. The user interface 600 may be presented in the user computing system 106, another suitable computing system of the computing environment 100, or any suitable combination thereof. This example is intended to be illustrative and non-limiting. Other examples may include more graphical features, fewer graphical features, different graphical features, or a different configuration of graphical features than is shown in FIG. 6.

The user interface 600 can include a table 602 containing information associated with a list of attributes impacting the risk indicator change. In some aspects, the table 602 can include the list of attributes, respective values of the list of attributes at a first time point and a second time point, respective total impacts of the list of attributes, or a combination thereof. To display the information associated with the list of attributes, the table 602 can have one or more sections 604. For example, the table 602 can have a first section 604a representing a first dataset for a previous assessment point and a second section 604b representing a second dataset for a current assessment point. As depicted in FIG. 6, the first section 604a and the second section 604b are columns, but other arrangements (e.g., rows) can be possible.

Each section 604 can include one or more subsections 606 that correspond to a respective attribute that contributes to the risk indicator change. The table 602 can order the list of attributes based on the impact of respective attributes. As depicted in FIG. 6, the most impactful attribute is listed at a top section of the table 602, but other arrangements (e.g., ordering from least impactful to most impactful) can be possible. A first set of subsections 606a for the first section 604a can correspond to a second set of subsections 606b for the second section 604b, thereby enabling comparison for the list of attributes at the previous assessment point and at the current assessment point. Each subsection 606 can include a value (e.g., a percentage, a decimal, etc.) associated with a corresponding attribute at a given time point. In some aspects, the second set of subsections 606b can include a magnitude for the impact on the risk indicator that is associated with each attribute listed in the table 602, thereby facilitating identification of reasoning for the risk indicator change. In additional or alternative aspects, the second set of subsections 606b may include recommendations that can improve the risk indicator associated with an entity for a future time. In such examples, the recommendations may be implemented by the entity, by a user computing system (e.g., the user computing system 106 of FIG. 1), or any combination thereof.

Computing System Example

Figure 7:
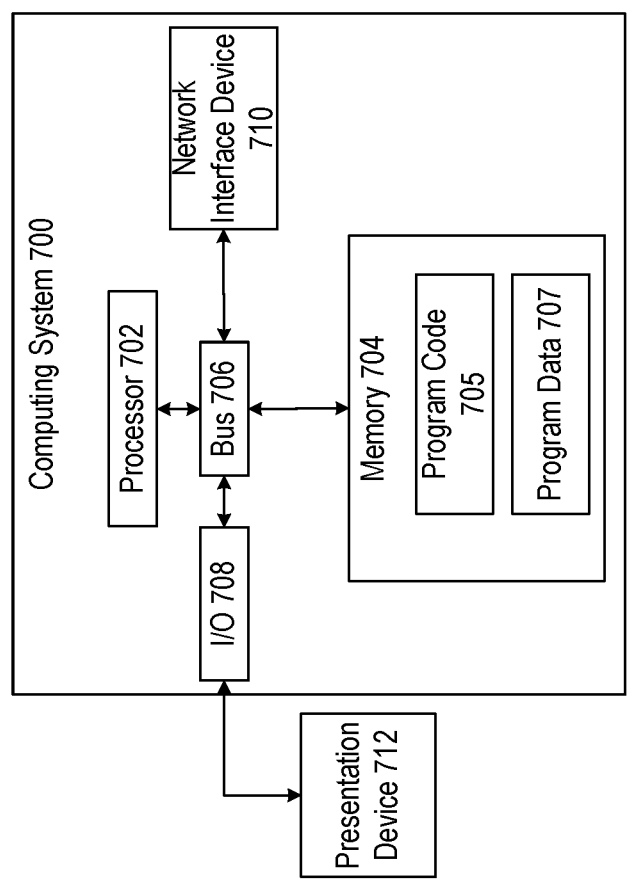
FIG. 7 is a block diagram depicting an example of a computing system suitable for implementing aspects of the techniques and technologies presented herein.

Any suitable computing system or group of computing systems can be used to perform the operations described herein. For example, FIG. 7 is a block diagram depicting an example of a computing system 700 that can be used to implement one or more of the systems depicted in FIG. 1 (e.g., an entity assessment server 118, a development server 110, a client or consumer computing system, etc.). The example of the computing system 700 can include various devices for communicating with other devices in the computing environment 100, as described with respect to FIG. 1. The computing system 700 can include various devices for performing one or more of the operations described above.

The computing system 700 can include a processor 702, which includes one or more devices or hardware components communicatively coupled to a memory 704. The processor 702 executes computer-executable program code 705 stored in the memory 704, accesses program data 707 stored in the memory 704, or both. Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing system 700 can execute program code 705. The program code 705 may be stored in any suitable computer-readable medium and may be executed on any suitable processing device. For example, as depicted in FIG. 7, an impact analysis model 114, program code for the model configuration application 112, or program code for software on a client or user computing system can reside in the memory 704 at the computing system 700. Executing the program code 705 can configure the processor 702 to perform one or more of the operations described herein.

Program code 705 stored in a memory 704 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Examples of the program code 705 include one or more of the applications, engines, or sets of program code described herein, such as an impact analysis model 114, a model configuration application 112, software on a client computing system 104 or user computing system 106, etc.

Examples of program data 707 stored in a memory 704 may include one or more databases, one or more other data structures, datasets, etc. For instance, if a memory 704 is a network-attached storage device, program data 707 can include attribute data stored in a risk data repository 122, as described above with respect to FIG. 1. If a memory 704 is a storage device used by a risk assessment computing system 130, program data 707 can include input attribute data, data obtained via interactions with client or consumer computing systems, etc.

The computing system 700 may also include a number of external or internal devices such as input or output devices. For example, the computing system 700 is shown with an input/output interface 708 that can receive input from input devices or provide output to output devices. Examples of the input devices can include a keyboard, mouse, touch-sensitive surface, etc. A bus 706 can also be included in the computing system 700. The bus 706 can communicatively couple one or more components of the computing system 700.

In some aspects, the computing system 700 can include one or more output devices. One example of an output device is the network interface device 710 depicted in FIG. 7. A network interface device 710 can include any device or group of devices suitable for establishing a wired or wireless data connection to one or more data networks (e.g., a public data network 108, a network 116, etc.). Non-limiting examples of the network interface device 710 include an Ethernet network adapter, a modem, etc. Another example of an output device is the presentation device 712 depicted in FIG. 6. A presentation device 712 can include any device or group of devices suitable for providing visual, auditory, or other suitable sensory output. Non-limiting examples of the presentation device 712 include a touchscreen, a monitor, a speaker, a separate mobile computing device, etc.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The invention claimed is:

1. A method, in which one or more processing devices perform operations comprising:

receiving a request for an assessment of a risk indicator change from a first risk indicator associated with an entity generated at a first time point to a second risk indicator associated with the entity generated at a second time point, wherein the first risk indicator and the second risk indicator are generated based on a plurality of attributes associated with the entity;

identifying a third time point between the first time point and the second time point for which a third risk indicator associated with the entity has been determined;

determining a first impact of each attribute of the plurality of attributes on a first risk indicator change from the first risk indicator to the third risk indicator;

determining a second impact of each attribute of the plurality of attributes on a second risk indicator change from the third risk indicator to the second risk indicator;

determining a total impact of each attribute of the plurality of attributes on the risk indicator change by aggregating the first impact and the second impact of each attribute;

generating assessment results comprising a list of attributes selected from the plurality of attributes, the list of attributes ordered according to the respective total impact of the attributes; and transmitting, to a remote computing device, the assessment results in response to the request for the assessment for use in improving the risk indicator of the entity which is used to control access to one or more interactive computing environments by the entity.

2. The method of claim 1, wherein the operations further comprise generating a user interface for presenting the assessment results, and transmitting the user interface along with the assessment results to cause the user interface to be presented on the remote computing device.

3. The method of claim 2, wherein the user interface comprises a table listing one or more of: the list of attributes, respective values of the list of attributes at the first time point and the second time point, or the respective total impacts of the list of attributes.

4. The method of claim 2, wherein the user interface comprises a first field configured for displaying a set of risk indicator values over a time period including the first time point and the second time point and a second field configured for displaying the total impact of each attribute in the list of attributes on a particular risk indicator change specified by a selection of two time points in the first field.

5. The method of claim 2, wherein the user interface comprises a first plurality of visual segments stacking along a first direction forming a first stack and a second plurality of visual segments stacking along a second direction opposite to the first direction forming a second stack, wherein:
each visual segment in the first plurality of visual segments and the second plurality of visual segments represents an attribute in the list of attributes and has a size in proportion to the total impact of the attribute on the risk indicator change;
a start of the first stack indicates the first risk indicator at the first time point;
an end of the second stack indicates the second risk indicator at the second time point; and
an end of the first stack and a start of the second stack indicate a same risk indicator value.

6. The method of claim 1, wherein the first impact and the second impact of each attribute of the plurality of attributes are determined using an integrated gradients model and wherein a first baseline of the integrated gradients model for determining the first impact is a first set of values for the plurality of attributes used to generate the first risk indicator and a second baseline of the integrated gradients model for determining the second impact is a second set of values for the plurality of attributes used to generate the third risk indicator.

7. The method of claim 6, wherein the integrated gradients model determines the first impact and the second impact along respective straight-line paths.

8. A non-transitory computer-readable storage medium having program code that is executable by a processor device to cause a computing device to perform operations, the operations comprising:
receiving a request for an assessment of a risk indicator change from a first risk indicator associated with an entity generated at a first time point to a second risk indicator associated with the entity generated at a second time point, wherein the first risk indicator and the second risk indicator are generated based on a plurality of attributes associated with the entity;

identifying a third time point between the first time point and the second time point for which a third risk indicator associated with the entity has been determined;

determining a first impact of each attribute of the plurality of attributes on a first risk indicator change from the first risk indicator to the third risk indicator;

determining a second impact of each attribute of the plurality of attributes on a second risk indicator change from the third risk indicator to the second risk indicator;

determining a total impact of each attribute of the plurality of attributes on the risk indicator change by aggregating the first impact and the second impact of each attribute;

generating assessment results comprising a list of attributes selected from the plurality of attributes, the list of attributes ordered according to the respective total impact of the attributes; and transmitting, to a remote computing device, the assessment results in response to the request for the assessment for use in improving the risk indicator of the entity which is used to control access to one or more interactive computing environments by the entity.

9. The non-transitory computer-readable storage medium of claim 8, wherein the operations further comprise generating a user interface for presenting the assessment results, and transmitting the user interface along with the assessment results to cause the user interface to be presented on the remote computing device.

10. The non-transitory computer-readable storage medium of claim 9, wherein the user interface comprises a table listing one or more of: the list of attributes, respective values of the list of attributes at the first time point and the second time point, or the respective total impacts of the list of attributes.

11. The non-transitory computer-readable storage medium of claim 9, wherein the user interface comprises a first field configured for displaying a set of risk indicator values over a time period including the first time point and the second time point and a second field configured for displaying the total impact of each attribute in the list of attributes on a particular risk indicator change specified by a selection of two time points in the first field.

12. The non-transitory computer-readable storage medium of claim 9, wherein the user interface comprises a first plurality of visual segments stacking along a first direction forming a first stack and a second plurality of visual segments stacking along a second direction opposite to the first direction forming a second stack, wherein:
each visual segment in the first plurality of visual segments and the second plurality of visual segments represents an attribute in the list of attributes and has a size in proportion to the total impact of the attribute on the risk indicator change;
a start of the first stack indicates the first risk indicator at the first time point;
an end of the second stack indicates the second risk indicator at the second time point; and
an end of the first stack and a start of the second stack indicate a same risk indicator value.

13. The non-transitory computer-readable storage medium of claim 8, wherein the first impact and the second impact of each attribute of the plurality of attributes are determined using an integrated gradients model and wherein a first baseline of the integrated gradients model for determining the first impact is a first set of values for the plurality of attributes used to generate the first risk indicator and a second baseline of the integrated gradients model for determining the second impact is a second set of values for the plurality of attributes used to generate the third risk indicator.

14. The non-transitory computer-readable storage medium of claim 13, wherein the integrated gradients model determines that the first impact and the second impact along respective straight-line paths.

15. A system comprising:
a processing device; and
a memory device in which instructions executable by the processing device are stored for causing the processing device to perform operations comprising:
receiving a request for an assessment of a risk indicator change from a first risk indicator associated with an entity generated at a first time point to a second risk indicator associated with the entity generated at a second time point, wherein the first risk indicator and the second risk indicator are generated based on a plurality of attributes associated with the entity;
identifying a third time point between the first time point and the second time point for which a third risk indicator associated with the entity has been determined;
determining a first impact of each attribute of the plurality of attributes on a first risk indicator change from the first risk indicator to the third risk indicator;
determining a second impact of each attribute of the plurality of attributes on a second risk indicator change from the third risk indicator to the second risk indicator;
determining a total impact of each attribute of the plurality of attributes on the risk indicator change by aggregating the first impact and the second impact of each attribute;
generating assessment results comprising a list of attributes selected from the plurality of attributes, the list of attributes ordered according to the respective total impact of the attributes; and
transmitting, to a remote computing device, the assessment results in response to the request for the assessment for use in improving the risk indicator of the entity which is used to control access to one or more interactive computing environments by the entity.

16. The system of claim 15, wherein the operations further comprise generating a user interface for presenting the assessment results, and transmitting the user interface along with the assessment results to cause the user interface to be presented on the remote computing device.

17. The system of claim 16, wherein the user interface comprises a table listing one or more of: the list of attributes, respective values of the list of attributes at the first time point and the second time point, or the respective total impacts of the list of attributes.

18. The system of claim 16, wherein the user interface comprises a first field configured for displaying a set of risk indicator values over a time period including the first time point and the second time point and a second field configured for displaying the total impact of each attribute in the list of attributes on a particular risk indicator change specified by a selection of two time points in the first field.

19. The system of claim 16, wherein the user interface comprises a first plurality of visual segments stacking along a first direction forming a first stack and a second plurality of visual segments stacking along a second direction opposite to the first direction forming a second stack, wherein:
each visual segment in the first plurality of visual segments and the second plurality of visual segments represents an attribute in the list of attributes and has a size in proportion to the total impact of the attribute on the risk indicator change;
a start of the first stack indicates the first risk indicator at the first time point;
an end of the second stack indicates the second risk indicator at the second time point; and
an end of the first stack and a start of the second stack indicate a same risk indicator value.

20. The system of claim 15, wherein the first impact and the second impact of each attribute of the plurality of attributes are determined using an integrated gradients model and wherein a first baseline of the integrated gradients model for determining the first impact is a first set of values for the plurality of attributes used to generate the first risk indicator and a second baseline of the integrated gradients model for determining the second impact is a second set of values for the plurality of attributes used to generate the third risk indicator.

* * * * *